US011108663B1

(12) United States Patent
Kaliyamoorthy

(10) Patent No.: US 11,108,663 B1
(45) Date of Patent: Aug. 31, 2021

(54) RING CONTROL DATA EXCHANGE SYSTEM

(71) Applicant: Dell Products L.P., Round Rock, TX (US)

(72) Inventor: Karthi Kaliyamoorthy, Guduvanchery (IN)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 16/799,426

(22) Filed: Feb. 24, 2020

(51) Int. Cl.
*G06F 15/173* (2006.01)
*H04L 12/26* (2006.01)
*H04L 9/06* (2006.01)
*H04L 29/06* (2006.01)
*H04L 12/42* (2006.01)

(52) U.S. Cl.
CPC ........ *H04L 43/0817* (2013.01); *H04L 9/0643* (2013.01); *H04L 12/42* (2013.01); *H04L 43/0876* (2013.01); *H04L 69/22* (2013.01); H04L 2012/421 (2013.01)

(58) Field of Classification Search
CPC ..... H04L 43/0817; H04L 12/42; H04L 69/22; H04L 43/0876; H04L 9/0643; H04L 2012/421; H04L 69/18; H04L 43/08; H04L 12/422
See application file for complete search history.

(56) References Cited

U.S. PATENT DOCUMENTS

| 2008/0126536 | A1* | 5/2008 | Sakurai | H04L 43/0823 709/224 |
| 2016/0105502 | A1* | 4/2016 | Shen | H04L 67/1063 709/205 |
| 2017/0085481 | A1* | 3/2017 | Park | H04L 67/06 |
| 2019/0149896 | A1* | 5/2019 | Grammel | H04Q 11/0003 398/3 |

* cited by examiner

*Primary Examiner* — Anh Nguyen
(74) *Attorney, Agent, or Firm* — Haynes and Boone, LLP

(57) ABSTRACT

A ring control data exchange system includes a first networking device in a first datacenter and a second networking device in a second datacenter and in a ring configuration with the first networking device. The second networking device identifies first control data packets, performs a hashing operation on the first control data packets to generate respective first control data hash values, and transmits the first control data packets to the first networking device. Subsequently, the second networking device identifies second control data packets, performs the hashing operation on the second control data packets to generate respective second control data hash values, determines that the respective second control data hash values match the respective first control data hash values and, in response, generates and transmits a first consolidated control data hash value to the first networking device while not transmitting the second control data packets to the first networking device.

17 Claims, 14 Drawing Sheets

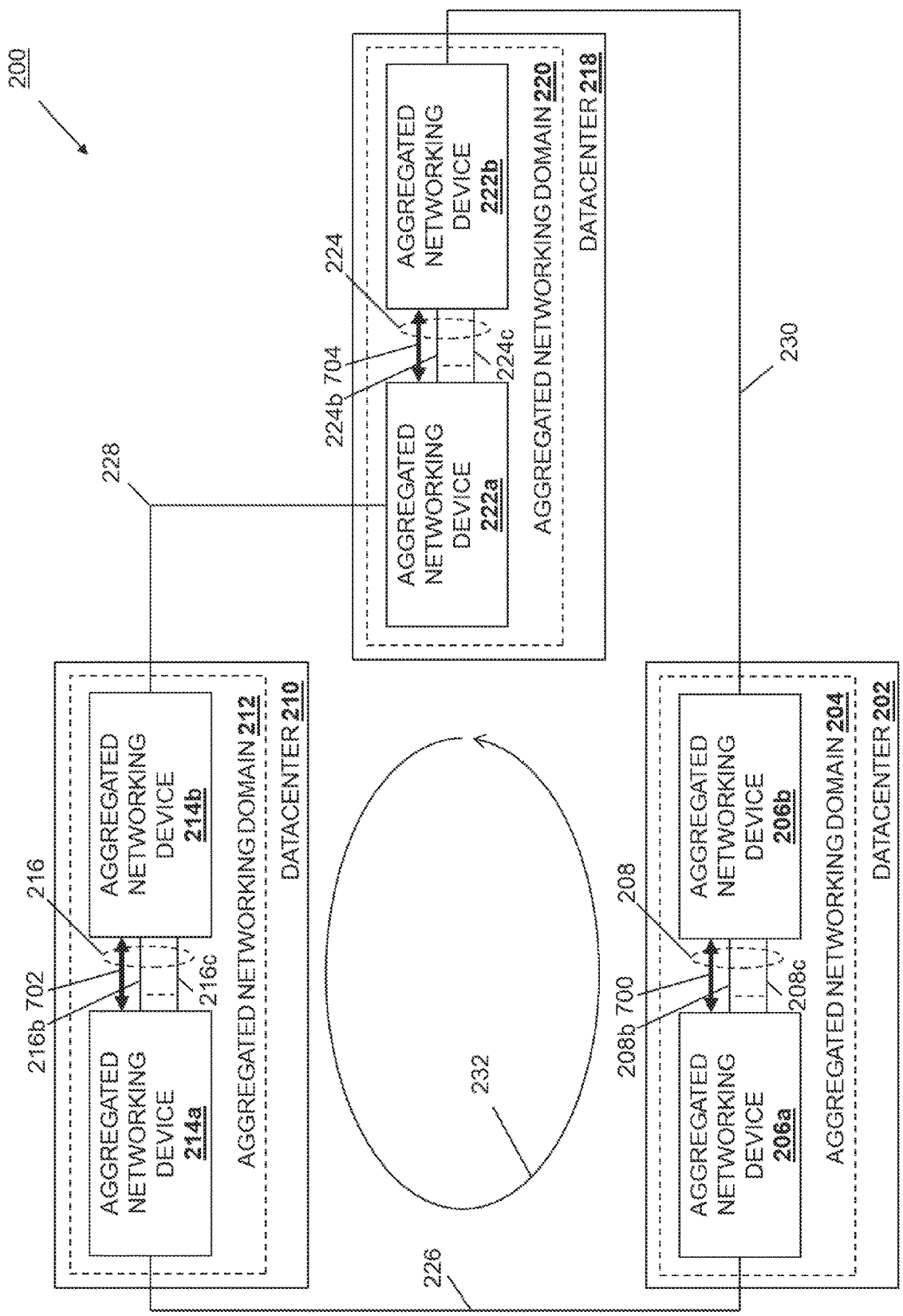

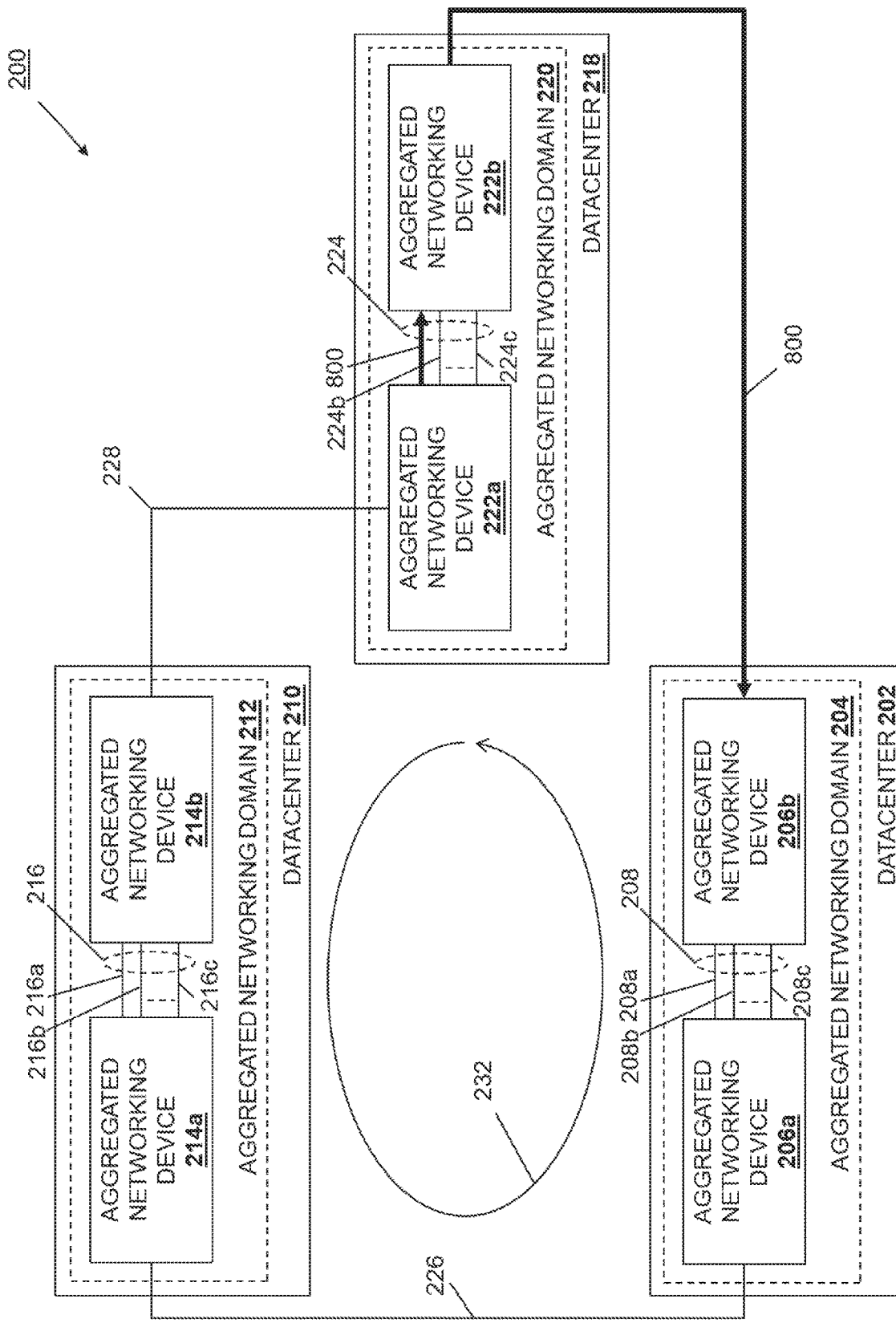

RING CONTROL DATA EXCHANGE SYSTEM

BACKGROUND

The present disclosure relates generally to information handling systems, and more particularly to the exchange of control data between information handling systems in a ring configuration.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems are sometime provided in ring configurations. For examples, networking computing devices such as switch devices may be provided in a ring configuration that spans datacenters. In a specific example, Virtual Link Trunking (VLT) switch devices (also referred to as VLT "peer" devices or "nodes") may be aggregated and may utilize the VLT protocol (a proprietary aggregation protocol provided in switch devices available from DELL® Inc. of Round Rock, Tex., United States) in order to provide VLT domains that provide a redundant, load-balancing connection to a core network in a loop-free environment while eliminating the need to utilize the Spanning Tree Protocol, with respective VLT domains provided in respective datacenters connected together and configured (e.g., via the FORCE 10® Resilient Ring Protocol (FRRP)) in a ring that spans those datacenters. It has been found that the exchange of control data for networking devices in such ring configurations can raise some issues.

For example, for VLT domains connected across datacenters using the FRRP discussed above, control data such as FRRP Protocol Data Units (PDUs) may be circulated around the ring configuration in order to maintain the ring configuration. In some situations, a "master" VLT switch device in the ring configuration may generate relatively high number of FRRP PDUs, which can utilize relatively high amounts of network bandwidth, require a relatively high utilization of control data processing and other hardware resources in the source and destination VLT switch devices, and in some situations cause control data such as FRRP Hello Ring Health-check Frame (HRHF) communications provided via the FRRP PDUs to be dropped by a VLT switch device due to, for example, processing system queue constraints, buffer unavailability issues, and/or other communication congestion side-effects known in the art, which can lead to corresponding communication links alternating between "up" and "down" states (also referred to as link "flapping"). Solutions to such issues include increasing a default "hello" message interval (e.g., typically 500 ms), which can reduce the issues described above, but also operates to slow down ring convergence. For example, the FRRP hello timeout period can be increased to reduce the number of FRRP PDUs being transmitted, but because the master VLT switch device will wait three times the FRRP hello timeout period to detect ring failure, doing so will increase the time needed for ring convergence in a ring failure situation.

Accordingly, it would be desirable to provide a ring control data exchange system that addresses the issues discussed above.

SUMMARY

According to one embodiment, an Information Handling System (IHS) includes a processing system; and a memory system that is coupled to the processing system and that includes instructions that, when executed by the processing system, cause the processing system to provide a ring control data exchange engine that is configured to: identify a plurality of first control data packets; perform a hashing operation on each of the plurality of first control data packets to generate respective first control data hash values; transmit the plurality of first control data packets out of a first datacenter to a first networking device included in a second datacenter; identify, subsequent to generating the respective first control data hash values, a plurality of second control data packets; perform the hashing operation on each of the plurality of second control data packets to generate respective second control data hash values; and determine that the respective second control data hash values match the respective first control data hash values and, in response, generate and transmit a first consolidated control data hash value out of the first datacenter to the first networking device included in the second datacenter while not transmitting the plurality of second control data packets to the first networking device.

BRIEF DESCRIPTION OF THE DRAWINGS

FIG. 7 is a schematic view illustrating an embodiment of the ring control data exchange system of FIG. 2 operating during the method of FIG. 4.

FIG. 8B is a schematic view illustrating an embodiment of the ring control data exchange system of FIG. 2 operating during the method of FIG. 4.

DETAILED DESCRIPTION

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 1:
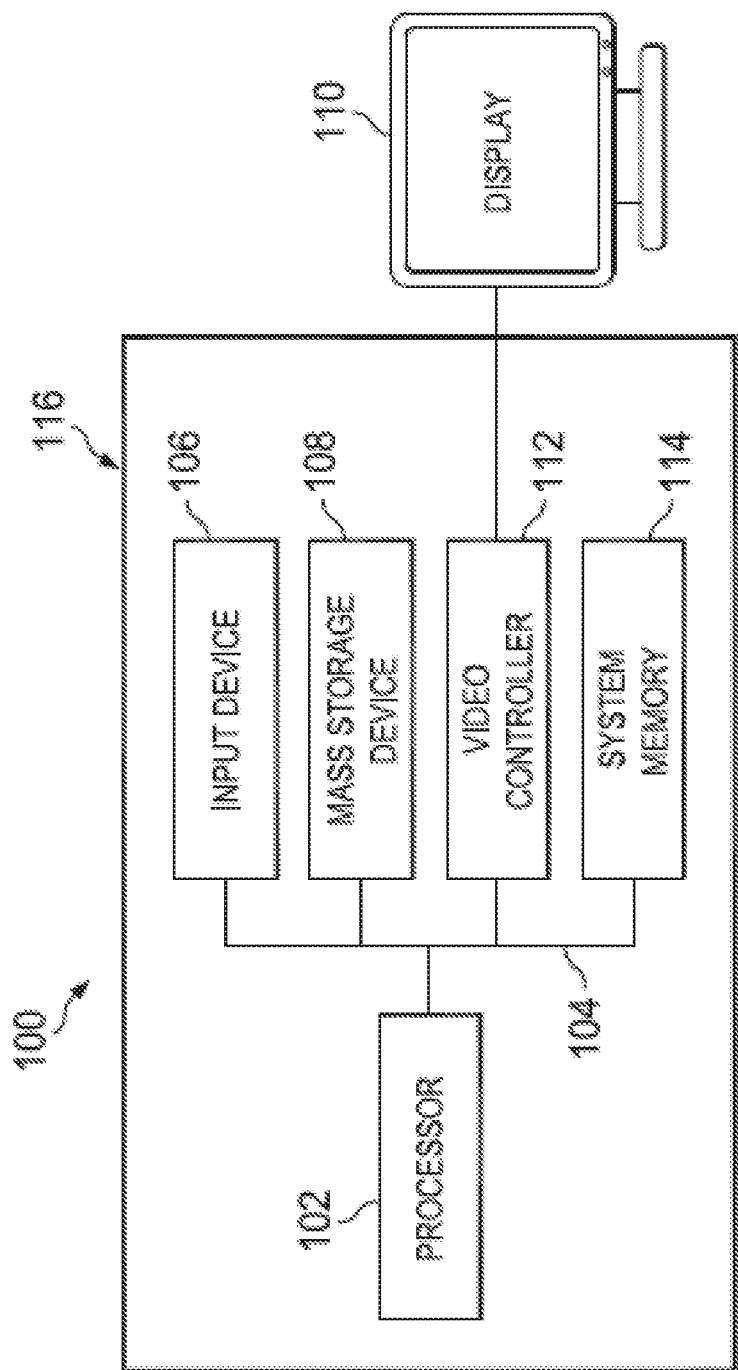
FIG. 1 is a schematic view illustrating an embodiment of an Information Handling System (IHS).

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Figure 2:
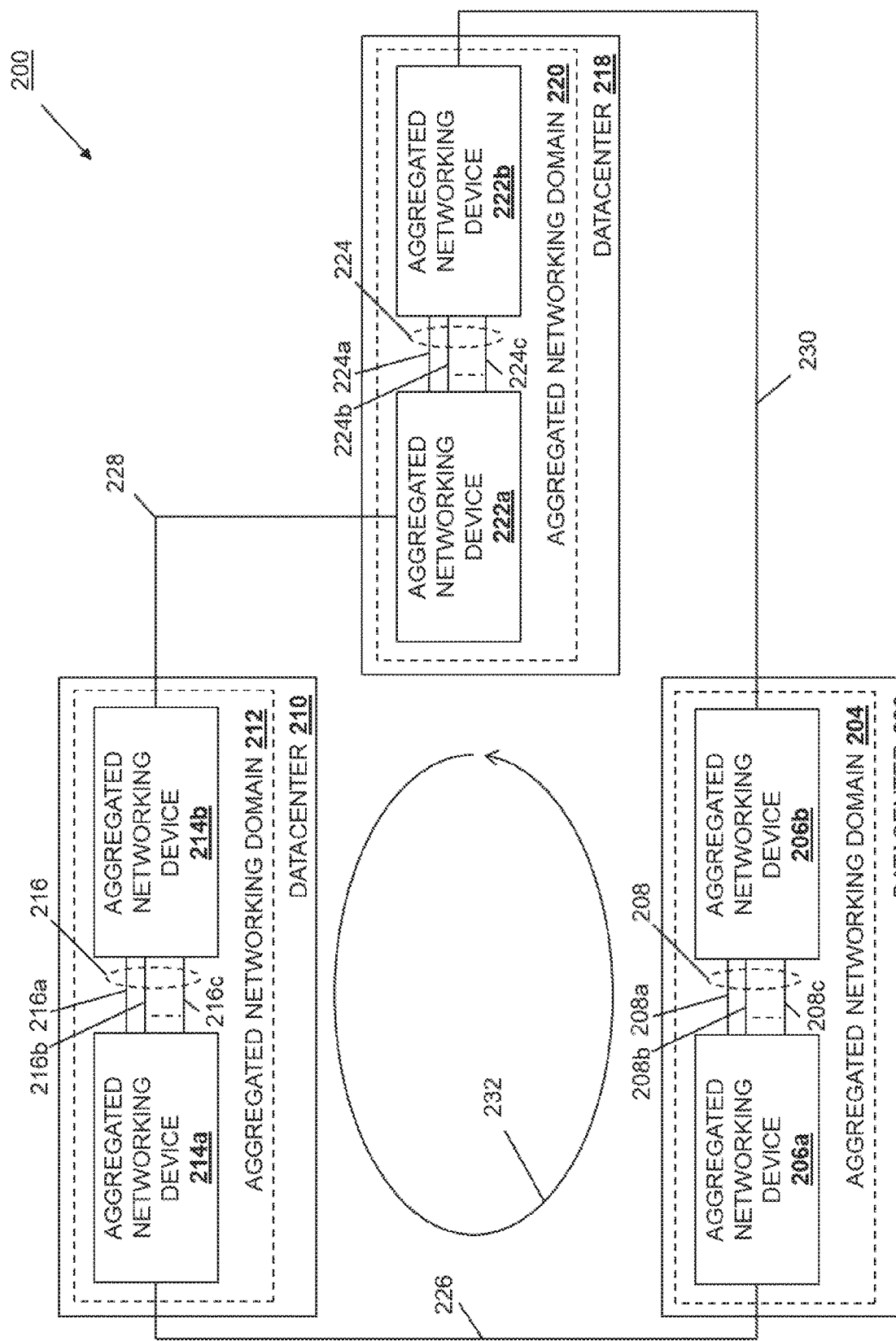
FIG. 2 is a schematic view illustrating an embodiment of a ring control data exchange system.

Referring now to FIG. 2, an embodiment of a ring control data exchange system 200 is illustrated. As discussed below, the ring control data exchange system 200 may include any number of datacenters, with each datacenter including an aggregated networking domain that is provided in a ring configuration with aggregated networking domains included in the other datacenters. For example, in the illustrated embodiment, the ring control data exchange system 200 incudes a datacenter 202 having an aggregated networking domain 204 that is provided by a pair of aggregated networking devices 206*a* and 206*b* that are coupled together by an Inter-Chassis Link (ICL) 208 made up of a plurality of links 208*a*, 208*b*, and up to 208*c*. In an embodiment, either or both of the aggregated networking devices 206*a* and 206*b* may be provided by the IHS 100 discussed above with reference to FIG. 1, and/or may include some or all of the components of the IHS 100, and in specific examples may be provided by VLT switch devices (also called VLT "peer" devices or "nodes") that utilize the VLT protocol (a proprietary aggregation protocol provided in switch devices available from DELL® Inc. of Round Rock, Tex., United States) in order to provide VLT domains that provide a redundant, load-balancing connection to a core network in a loop-free environment while eliminating the need to utilize the Spanning Tree Protocol. For example, the aggregated networking device 206*a* may be configured as a "primary" VLT switch device, the aggregated networking device 206*b* may be configured as a "secondary" VLT switch device, the ICL 208 may be provided by a VLT interconnect (VLTi), and the aggregated networking domain 204 may provide a VLT domain. However, while illustrated and discussed as aggregated VLT switch devices, one of skill in the art in possession of the present disclosure will recognize that aggregated networking device provided in the ring control data exchange system 200 may include any devices that may be configured to operate similarly as the aggregated networking devices 206*a* and 206*b* discussed below.

Similarly, in the illustrated embodiment, the ring control data exchange system 200 incudes a datacenter 210 having an aggregated networking domain 212 that is provided by a pair of aggregated networking devices 214*a* and 214*b* that are coupled together by an Inter-Chassis Link (ICL) 216 made up of a plurality of links 216*a*, 216*b*, and up to 216*c*, and the ring control data exchange system 200 incudes a datacenter 218 having an aggregated networking domain 220 that is provided by a pair of aggregated networking devices 222*a* and 222*b* that are coupled together by an Inter-Chassis Link (ICL) 224 made up of a plurality of links 224*a*, 224*b*, and up to 224*c*. Similarly as described above, any or all of the aggregated networking devices 214*a*, 214*b*, 222*a*, and 222*b* may be provided by the IHS 100 discussed above with reference to FIG. 1, and/or may include some or all of the components of the IHS 100, and in specific examples may be provided by VLT switch devices, or any devices that may be configured to operate similarly as the aggregated networking devices 214*a*, 214*b*, 222*a*, and 222*b* discussed below. For example, the aggregated networking device 214*a* may be configured as a "primary" VLT switch device that is connected via the VLTi/ICL 216 to the aggregated networking device 214*b* configured as a "secondary" VLT switch device in the VLT/aggregated networking domain 212, and the aggregated networking device 222*a* may be configured as a "primary" VLT switch device that is connected via the VLTi/ICL 224 to the aggregated networking device 222b configured as a "secondary" VLT switch device in the VLT/aggregated networking domain 220/VLT domain.

In the illustrated embodiment, the aggregated networking domains 204, 212, and 220 are provided in a ring configuration via a link 226 between the aggregated networking device 206a and the aggregated networking device 214a (e.g., between "orphan" ports on the aggregated networking devices 206a and 214a), a link 228 between the aggregated networking device 214a and the aggregated networking device 222a (e.g., between "orphan" ports on the aggregated networking devices 206a and 222a), and a link 230 between the aggregated networking device 206b and the aggregated networking device 222b (e.g., between "orphan" ports on the aggregated networking devices 206b and 222b). As will be appreciated by one of skill in the art in possession of the present disclosure, the ring configuration of the aggregated networking domains 204, 212, and 220 allows for a plurality of rings to be provided in the ring control data exchange system 200 using the ring protocols such as the FRRP discussed above. In the examples below, the aggregated networking domain 212/datacenter 210 is configured as the "master" of the rings provided in the ring control data exchange system 200, but one of skill in the art in possession of the present disclosure will appreciate that other aggregated networking domains/datacenters may be utilized as a ring master while remaining within the scope of the present disclosure as well. While a specific ring control data exchange system 200 has been illustrated and described, one of skill in the art in possession of the present disclosure will recognize that the ring control data exchange system of the present disclosure may include a variety of components and component configurations while remaining within the scope of the present disclosure as well.

Figure 3:
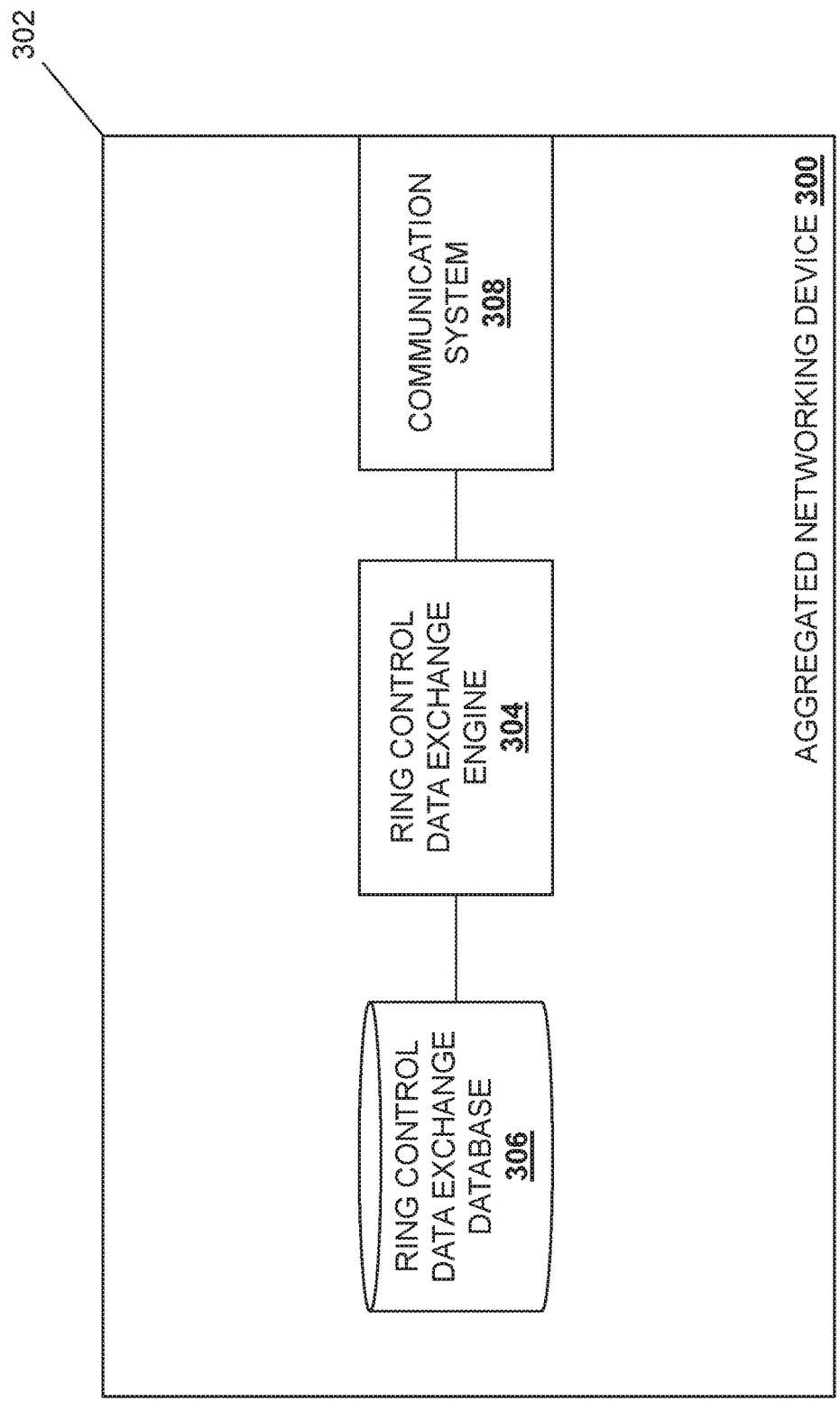
FIG. 3 is a schematic view illustrating an embodiment of an aggregated networking device that may be provided in the ring control data exchange system of FIG. 2.

Referring now to FIG. 3, an embodiment of an aggregated networking device 300 is illustrated that may provide any or all of the aggregated networking devices 204a, 204b, 214a, 214b, 222a, and 222b discussed above with reference to FIG. 2. As such, the aggregated networking device 300 may be provided by the IHS 100 discussed above with reference to FIG. 1 and/or may include some or all of the components of the IHS 100, and in specific examples may be provided by an aggregated VLT switch device. Furthermore, while illustrated and discussed as being provided by an aggregated VLT switch device, one of skill in the art in possession of the present disclosure will recognize that the functionality of the aggregated networking device 300 discussed below may be provided by other devices that are configured to operate similarly as the aggregated networking device 300 discussed below. In the illustrated embodiment, the aggregated networking device 300 includes a chassis 302 that houses the components of the aggregated networking device 300, only some of which are illustrated below. For example, the chassis 302 may house a processing system (not illustrated, but which may include the processor 102 discussed above with reference to FIG. 1) and a memory system (not illustrated, but which may include the memory 114 discussed above with reference to FIG. 1) that is coupled to the processing system and that includes instructions that, when executed by the processing system, cause the processing system to provide a ring control data exchange engine 304 that is configured to perform the functionality of the ring control data exchange engines and/or aggregated networking devices discussed below.

The chassis 302 may also house a storage system (not illustrated, but which may include the storage 108 discussed above with reference to FIG. 1) that is coupled to the ring control data exchange engine 304 (e.g., via a coupling between the storage system and the processing system) and that includes a ring control data exchange database 306 that is configured to store any of the information utilized by the ring control data exchange engine 304 discussed below. The chassis 302 may also house a communication system 308 that is coupled to the ring control data exchange engine 304 (e.g., via a coupling between the communication system 308 and the processing system) and that may be provided by a Network Interface Controller (NIC), wireless communication systems (e.g., BLUETOOTH®, Near Field Communication (NFC) components, WiFi components, etc.), and/or any other communication components that would be apparent to one of skill in the art in possession of the present disclosure. As such, one of skill in the art in possession of the present disclosure will appreciate that the communication system 208 may include any of the ports and/or provide any of the links that are described below as coupling the aggregated networking device 300 to any of the other aggregated networking devices. However, while a specific aggregated networking device 300 has been illustrated, one of skill in the art in possession of the present disclosure will recognize that aggregated networking devices (or other devices operating according to the teachings of the present disclosure in a manner similar to that described below for the aggregated networking device 300) may include a variety of components and/or component configurations for providing conventional aggregated networking device functionality, as well as the functionality discussed below, while remaining within the scope of the present disclosure as well.

Figure 4:
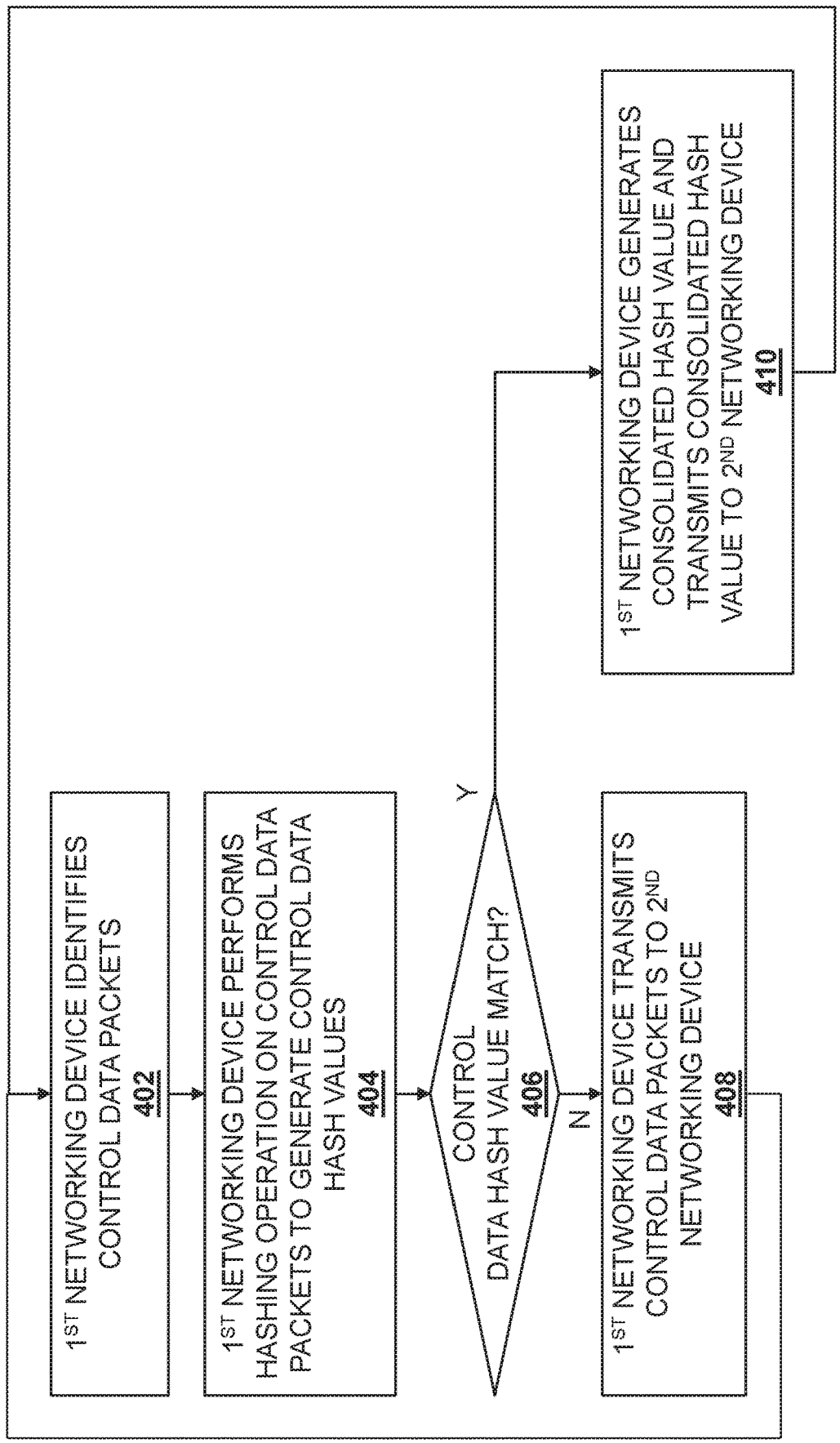
FIG. 4 is a flow chart illustrating an embodiment of a method for exchanging control data in a ring configuration.

Referring now to FIG. 4, an embodiment of a method 400 for exchanging control data in a ring configuration is illustrated. As discussed below, the systems and methods of the present disclosure provide for reductions in the transmission of control data between aggregated networking domains that are included in respective datacenters and that are provided in a ring configuration, with the method 400 allowing a "control data source" computing device to transit a consolidated control data hash value when a plurality of duplicative control data is received. As discussed below with regard to the method 500, the consolidated control data hash value may indicate to "control data destination" computing devices that no rings provided by the aggregated networking domains have failed. For example, a first aggregated networking device that provides a first aggregated networking domain in a first datacenter may identify first control data packets, perform a hashing operation on each of the first control data packets to generate respective first control data hash values, and then transmit the first control data packets to the first networking device. Subsequent to generating the respective first control data hash values, the first aggregated networking device may identify second control data packets, perform the hashing operation on each of the second control data packets to generate respective second control data hash values, determine that the respective second control data hash values match the respective first control data hash values and, in response, generate and transmit a first consolidated control data hash value to a second aggregated networking device that provides a second aggregated networking domain in a second datacenter, while not transmitting the second control data packets to the second networking device. As will be appreciated by one of skill in the art in possession of the present disclosure, the transmission of the consolidated control data hash value rather than the second control data packets utilizes relatively lower amounts of network bandwidth, requires a relatively lower utilization of control data processing and other hardware resources in the control data source and destination computing devices, and prevents the dropping of control data that occurs in conventional ring control data exchange systems.

Figure 6:
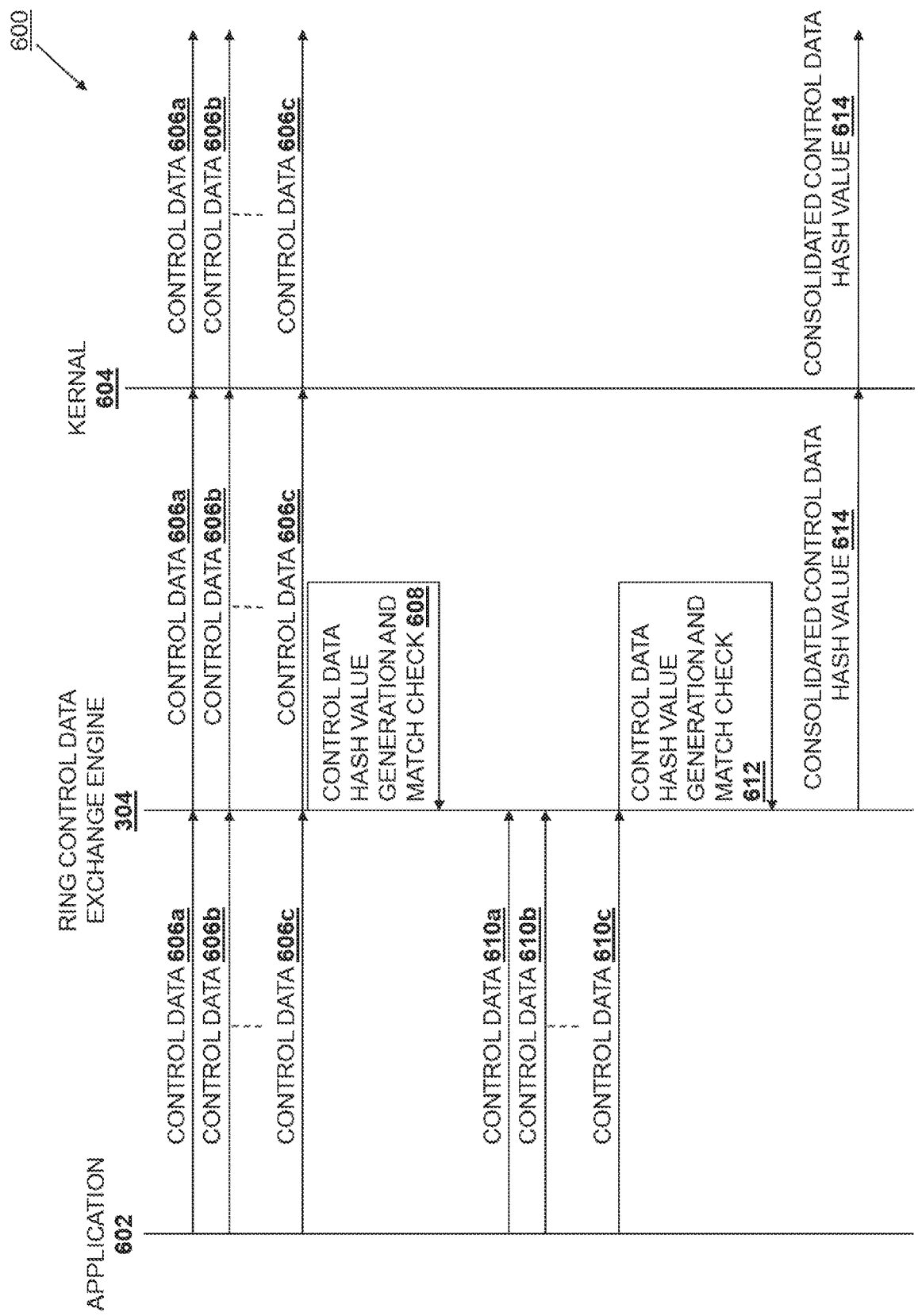
FIG. 6 is a swim-lane diagram illustrating an embodiment of communications performed by the aggregated networking device of FIG. 3 during the method of FIG. 4.

The method 400 begins at block 402 where a first networking device identifies control data packets. In an embodiment, at block 402, the ring control data exchange engine 304 in the aggregated networking device 300 may operate to identify control data packets. While the examples below describe the operation of the aggregated networking device 214a/300 (e.g., a "primary" aggregated networking device) that provides the aggregated networking domain 212 in the datacenter 210 as configured as a "ring master" that performs the method 400, one of skill in the art in possession of the present disclosure will appreciate that the discussion below may apply to any aggregated networking device operating as a primary aggregated networking device providing an aggregated networking domain in a datacenter and configured as a ring master to perform the method 400 while remaining within the scope of the present disclosure as well. With reference to FIG. 6, a swim lane diagram 600 is provided that illustrates an embodiment of the operation of the aggregated networking device 214a/300 during the method 400, with the ring control data exchange engine 304 in the aggregated networking device 214a/300 in communication with an application 502 in the aggregated networking device 214a/300 and a kernel 604 in the aggregated networking device 214a/300.

As illustrated in FIG. 6, the application 602 may generate a plurality of control data packets 606a, 606b, and 606c, and those control data packets 606a-606c may be identified by the ring control data exchange engine 304 at block 402. For example, at any particular time or time period, the application 602 may generate respective control data packets for each of the rings 232 provided via the ring configuration of the aggregated networking domains 204, 212, and 220, with the respective control data packets identified by the ring control data exchange engine 304 at block 402 as discussed above. For example, each of the control data/control data packets 606a-606c may include an FRRP Hello Ring Health-check Frame (HRHF) communication provided via a FRRP PDU for each ring provided via the ring configuration of the aggregated networking domains 204, 212, and 220. However, one of skill in the art in possession of the present disclosure will appreciate that the ring control data exchange engine 304 may identify control data packets generated in a variety of manners that will fall within the scope of the present disclosure as well.

The method 400 then proceeds to block 404 where the first networking device performs a hashing operation on the control data packets to generate control data hash values. In an embodiment, at block 404, the ring control data exchange engine 304 in the aggregated networking device 214a/300 may operate to perform a hashing operation on each of the plurality of control data packets identified at block 402 in order to generate respective control data hash values associated with each of those control data packets. As such, with reference FIG. 6, the ring control data exchange engine 304 may perform control data hash value generation operations (as part of control data hash value generation and match check operations 608 illustrated in FIG. 6) on each of the control data packets 606a, 606b, and up to 606c, which one of skill in the art in possession of the present disclosure will appreciate operates to generate respective control data hash values. In a specific example, the hashing operation (i.e., used to perform the control data hash value generation operations discussed above) may be performed using the Secure Hashing Algorithm 256 (SHA-256), although one of skill in the art in possession of the present disclosure will appreciate that other hashing algorithms or operations will fall within the scope of the present disclosure as well.

In some embodiments, the primary aggregated networking device in an aggregated networking domain may perform synchronizing operations with the secondary aggregated networking device in that aggregated networking domain in order to synchronize the control data hash values generated at block 404. For example, FIG. 7 illustrates how the "primary" aggregated networking device 214a may perform synchronizing operations 702 with the "secondary" aggregated networking device 214b to synchronize control data hash values generated by the "primary" aggregated networking device 214a at block 404. Further, as discussed in further detail below, FIG. 7 also illustrates how the "primary" aggregated networking device 206a may perform synchronizing operations 700 with the "secondary" aggregated networking device 206b to synchronize the control data hash values generated from control data packets during the method 400, and the "primary" aggregated networking device 222a may perform synchronizing operations 704 with the "secondary" aggregated networking device 222b to synchronize control data hash values generated from control data packets during the method 400. As such, one of skill in the art in possession of the present disclosure will appreciate that both aggregated networking devices in each aggregated networking domain may store the control data hash value generated for control data packets identified by the primary aggregated networking device in that aggregated networking domain, or received during the method 400.

The method 400 then proceeds to decision block 406 where it is determined whether there is a control data hash value match. In an embodiment, at decision block 406, the ring control data exchange engine 304 in the aggregated networking device 214a/300 may operate to check whether the control data hash values generated at block 404 match previously generated control data hash values that are stored in its ring control data exchange database 306. As discussed below, when "new" control data packets are received by the ring control data exchange engine 304 that include information that has not been previously received, the control data hash values for those control data packets will be stored in the ring control data exchange database 306. As will be appreciated by one of skill in the art in possession of the present disclosure, decision block 406 allows the ring control data exchange engine 304 to check to determine whether current control data packets have been identified at block 402 that include information that is identical to that identified in previous control data packets, as the control data hash value generated for any currently received control data packet will only match the control data hash value generated for any previously received control data packet if those current control data packets and previous control data packets include identical information. For example, with reference FIG. 6, the ring control data exchange engine 304 may perform control data hash value match check operations (as part of control data hash value generation and match check operations 608 illustrated in FIG. 6), and determine whether the control data hash values generated at block 404 match any control data hash values stored in the ring control data exchange database 306.

If, at decision block 406, it is determined that there is no control data hash value match, the method 400 proceeds to block 408 where the first networking device transmits the control data packets to a second networking device. In an embodiment, at block 408 and in response to determining that the control data hash values generated at block 404 do not match any control data hash values stored in the ring control data exchange database 306, the ring control data exchange engine 304 in the aggregated networking device 214a/300 may operate to transmit the control data packets received at block 402 via its communication system 308 to an aggregated networking device providing a different aggregated networking domain in a different datacenter. Furthermore, in response to determining that the control data hash values generated at block 404 do not match any control data hash values stored in the ring control data exchange database 306, the ring control data exchange engine 304 in the aggregated networking device 214a/300 may store those control data hash values in its ring control data exchange database 306.

Figure 8A:
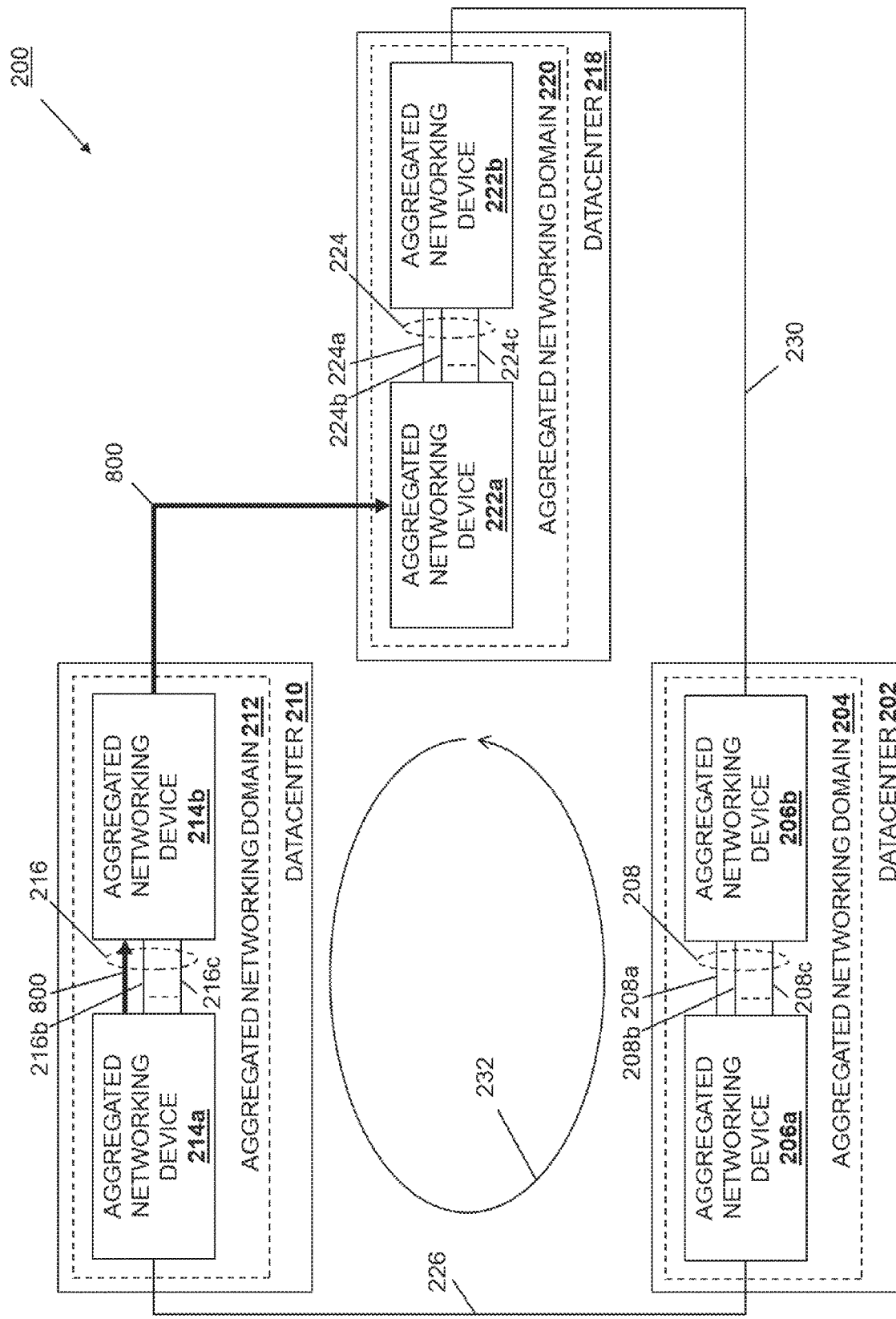
FIG. 8A is a schematic view illustrating an embodiment of the ring control data exchange system of FIG. 2 operating during the method of FIG. 4.

For example, with reference to FIG. 6 and following a determination that the control data hash values generated at block 404 do not match any control data hash values stored in the ring control data exchange database 306, the ring control data exchange engine 304 in the aggregated networking device 214a/300 may provide the control data packets 606a, 606b, and up to 606c to the kernel 604, which may then forward those control data packets 606a, 606b, and up to 606c via the communication system 308. With reference to FIG. 8A, the aggregated networking device 214a/300 may provide the control data packets 800 through the ICL 216 to the aggregated networking device 214b for transmission via the link 228 to the aggregated networking device 222a at block 408. FIG. 8B illustrates how the aggregated networking device 222a/300 may then provide the control data packets 800 through the ICL 224 to the aggregated networking device 222b for transmission via the link 230 to the aggregated networking device 206b at block 408.

Figure 8C:
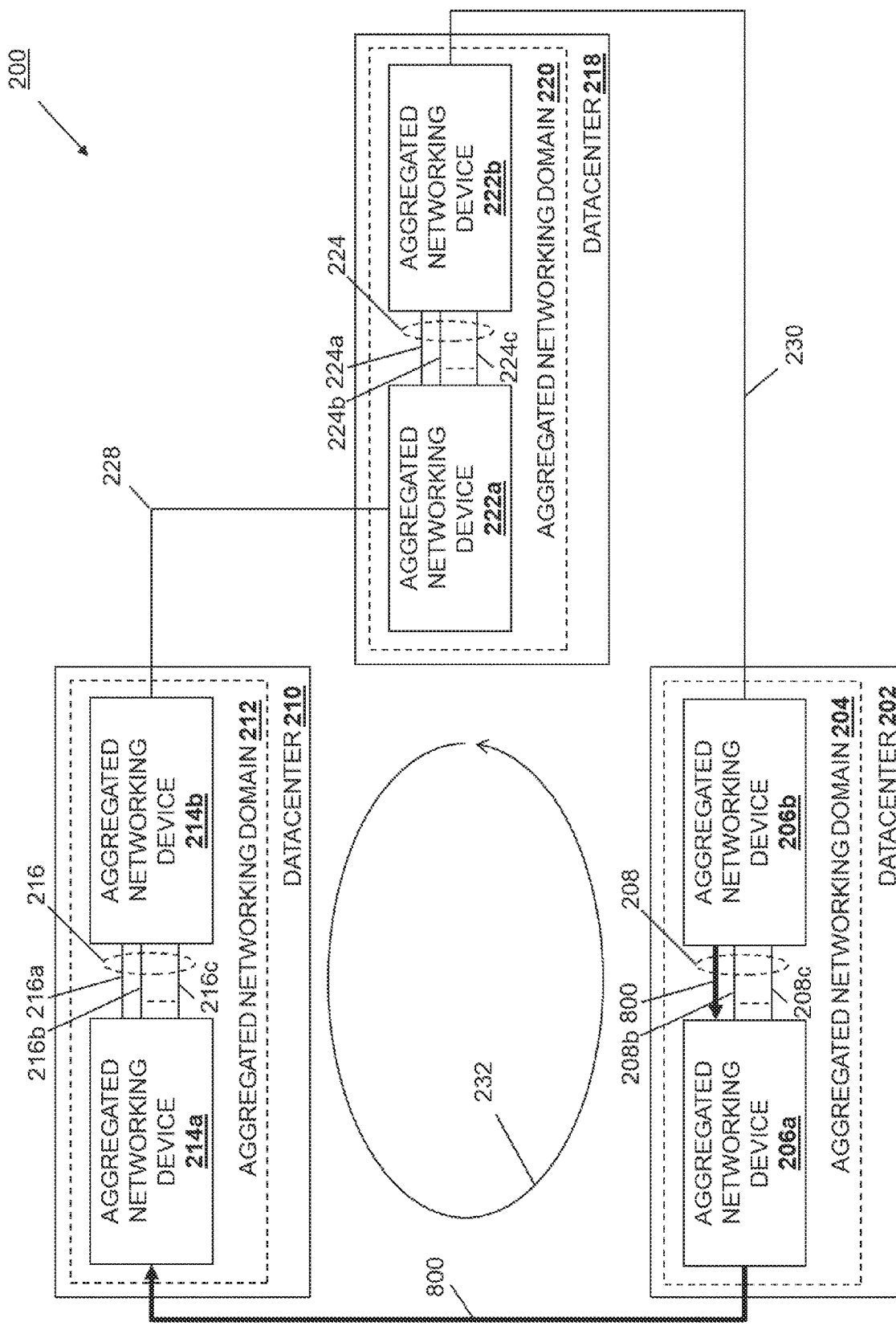
FIG. 8C is a schematic view illustrating an embodiment of the ring control data exchange system of FIG. 2 operating during the method of FIG. 4.

Furthermore, FIG. 8C illustrates how the aggregated networking device 222b/300 may provide the control data packets 800 through the ICL 208 to the aggregated networking device 206a for transmission via the link 226 to the aggregated networking device 214a at block 408. As such, the "new" control data packets 800 are circulated around the ring configuration of the aggregated networking domains 212, 220, and 204, and one of skill in the art in possession of the present disclosure will appreciate how those control data packets 800 may be used, for example, by the primary aggregated networking device in each of the aggregated networking domains 212, 220, and 204 to verify the integrity of the rings 232. The method 400 then returns to block 402. As such, for any "new" control data packets, the ring control data exchange engine in the aggregated networking device operating as the ring master, which provides an aggregated networking domain in a datacenter that is included in a ring configuration, will generate respective control data hash values for those control data packets, store those control data hash values, and circulate those control data packets to the other aggregated networking devices providing other aggregated networking domains in other datacenters that are included in the ring configuration. Furthermore, the primary aggregated networking device in each aggregated networking domain/datacenter that is not configured as the ring master may generated the control data hash values from those control data packets, store those control data hash values in their ring control data exchange databases, and synchronize those control data hash values with their secondary aggregated networking devices, as discussed above with reference to FIG. 7.

If at decision block 406, it is determined that there is a control data hash value match, the method 400 proceeds to block 410 where the first networking device generates a consolidated control data hash value and transmits the consolidated control data hash value to a second networking device. In an embodiment, at block 410 and in response to determining that the control data hash values generated at block 404 match control data hash values stored in the ring control data exchange database 306, the ring control data exchange engine 304 in the aggregated networking device 214a/300 may operate to generate a consolidated control data hash value from the control data hash values generated at block 404, and transmit the consolidated control data hash value via its communication system 308 to an aggregated networking device providing a different aggregated networking domain in a different datacenter. Furthermore, in response to generating the consolidated control data hash value, the ring control data exchange engine 304 in the aggregated networking device 214a/300 may store the consolidated control data hash value generated from the control data hash values in the ring control data exchange database 306.

With reference to FIG. 6, following the receiving and forwarding of the control data packets 606a-606c (as well as the generation and storage of the control data hash values corresponding to those control data packets 606a-606c, discussed above), the application 602 may generate a plurality of control data packets 610a, 610b, and 610c that may be identified by the ring control data exchange engine 304 in substantially the same manner as discussed above with reference to block 402. In this example, the control data packets 610a, 610b, and 610c include the same information as the control data packets 606a, 606b, and 606c due to, for example, no change occurring in the rings 232 provided by the ring configuration of the aggregated networking domains 204, 212, and 220. As such, the ring control data exchange engine 304 in the aggregated networking device 214a/300 may perform control data hash value generation and match check operations 612 in substantially the same manner as discussed above for the control data hash value generation and match check operations 608, which one of skill in the art in possession of the present disclosure will appreciate will result in a determination that the control data hash values generated from the control data packets 610a-610c match the control data hash values generated from the control data packets 606a-606c (i.e., because they are each generated via the same hashing operation performed on the same information.)

In response to determining that the control data hash values generated from the control data packets 610a-610c match the control data hash values generated from the control data packets 606a-606c and stored in the ring control data exchange database 306, the ring control data exchange engine 304 in the aggregated networking device 214a/300 may generate a consolidated control data hash value. For example, the ring control data exchange engine 304 may perform a hashing operation on each of the control data hash values that were generated for the control data packets 606a-606c (or 610a-610c) in order to generate the consolidated control data hash value at block 410. As discussed above, the application 602 may generate respective control data packets for each of the rings 232 provided via the ring configuration of the aggregated networking domains 204, 212, and 220, and thus the consolidated control data hash value may be generated by performing a hashing operation on the control data hash values generated from the respective control data provided for each of the rings 232 at any particular time or time period. Similarly as discussed above, the hashing operation may be performed using the SHA-256, although one of skill in the art in possession of the present disclosure will appreciate that other hashing algorithms or operations will fall within the scope of the present disclosure as well.

As discussed above, the primary aggregated networking device in an aggregated networking domain may perform synchronizing operations with the secondary aggregated networking device in that aggregated networking domain in order to synchronize the consolidated hash value generated at block 410. For example, FIG. 7 illustrates how the "primary" aggregated networking device 214a may perform synchronizing operations 702 with the "secondary" aggregated networking device 214b to synchronize a consolidated hash value generated by the "primary" aggregated networking device 214a at block 410. Furthermore, FIG. 7 also illustrates how the "primary" aggregated networking device 206a may perform synchronizing operations 700 with the "secondary" aggregated networking device 206b to synchronize a consolidated hash value received at block 410, and the "primary" aggregated networking device 222a may perform synchronizing operations 704 with the "secondary" aggregated networking device 222b to synchronize a consolidated hash value received at block 410, as discussed in further detail below. As such, one of skill in the art in possession of the present disclosure will appreciate that both aggregated networking devices in each aggregated networking domain may store the consolidated control data hash value generated by the primary aggregated networking device in that aggregated networking domain.

Figure 9A:
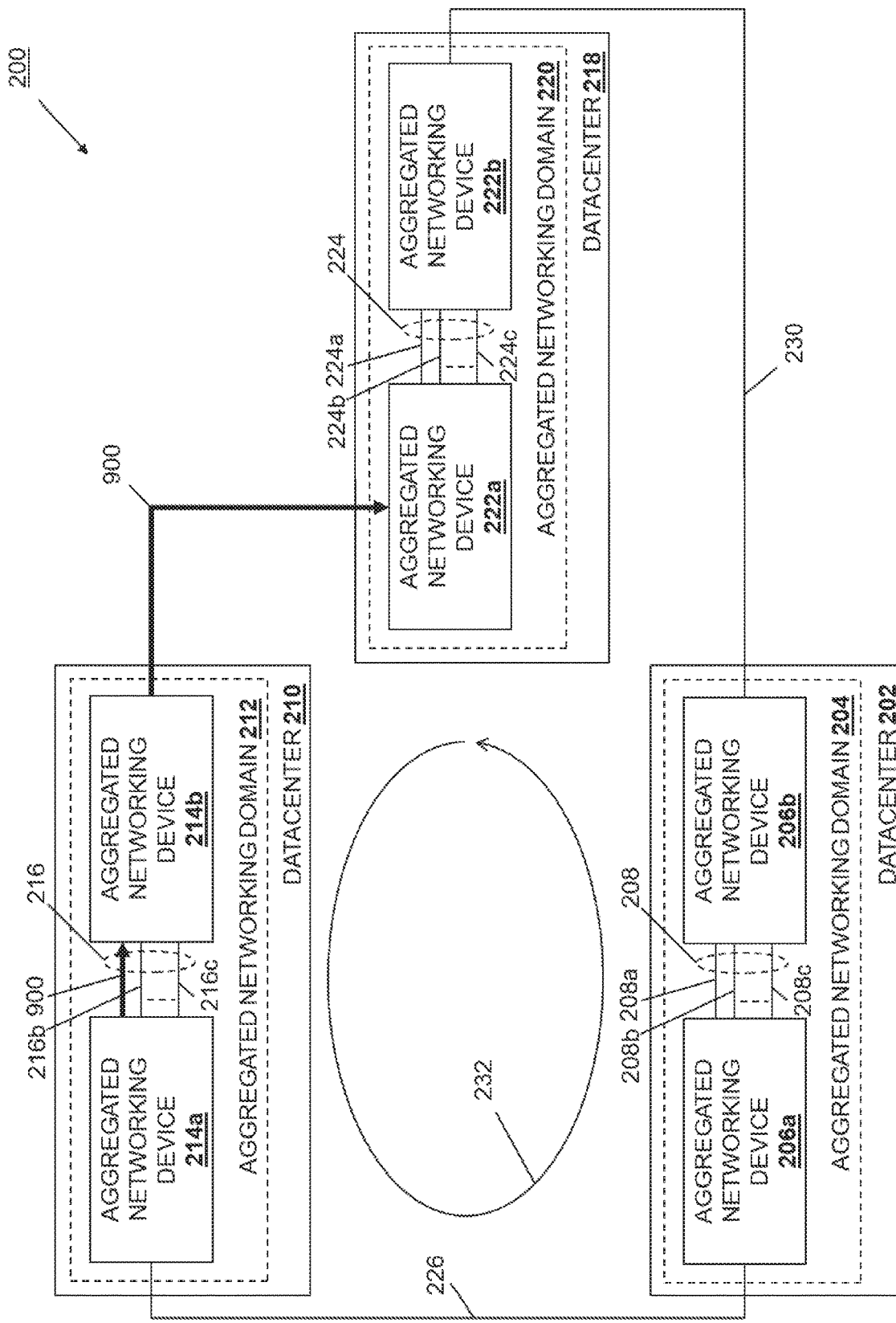
FIG. 9A is a schematic view illustrating an embodiment of the ring control data exchange system of FIG. 2 operating during the method of FIG. 4.
Figure 9B:
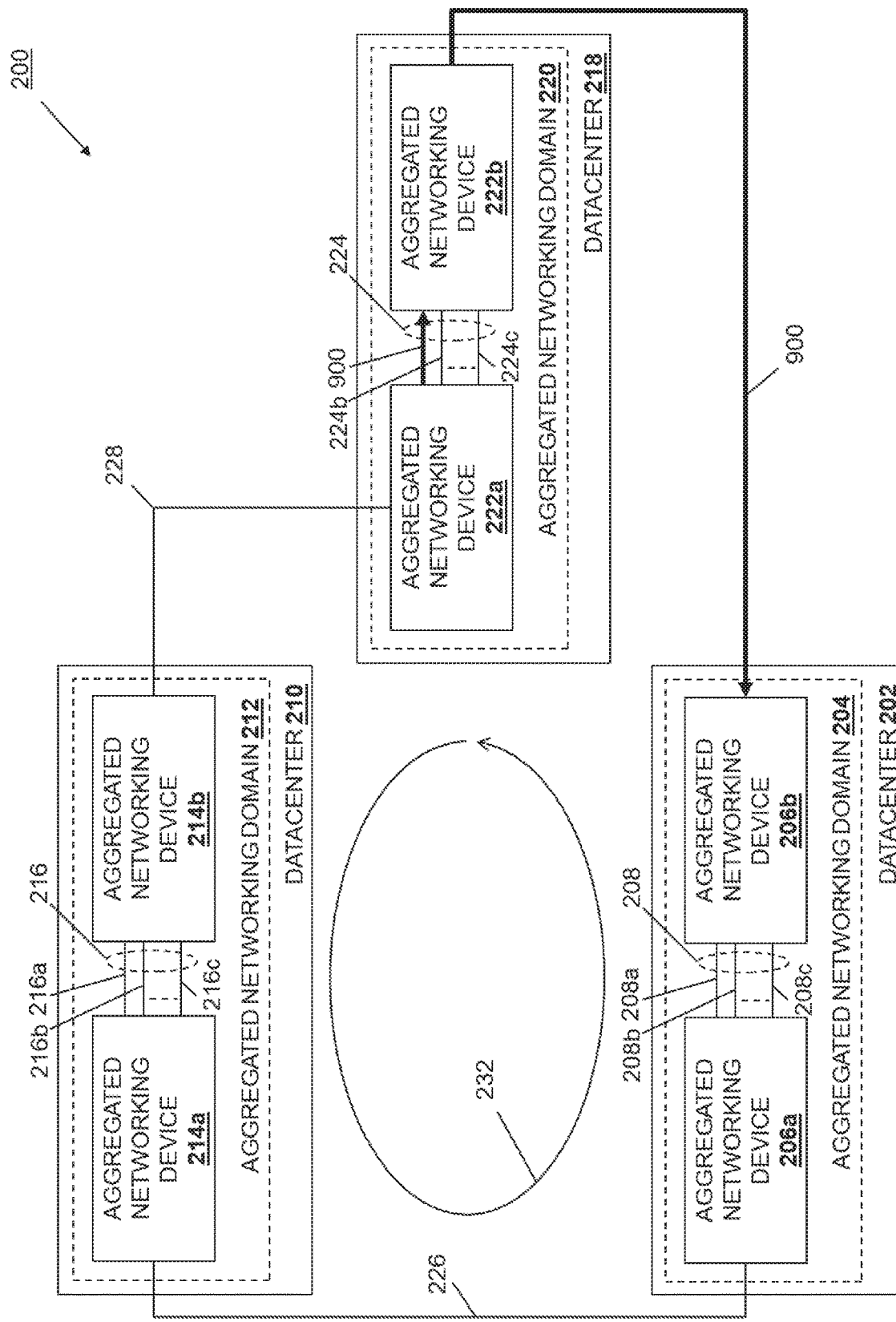
FIG. 9B is a schematic view illustrating an embodiment of the ring control data exchange system of FIG. 2 operating during the method of FIG. 4.
Figure 9C:
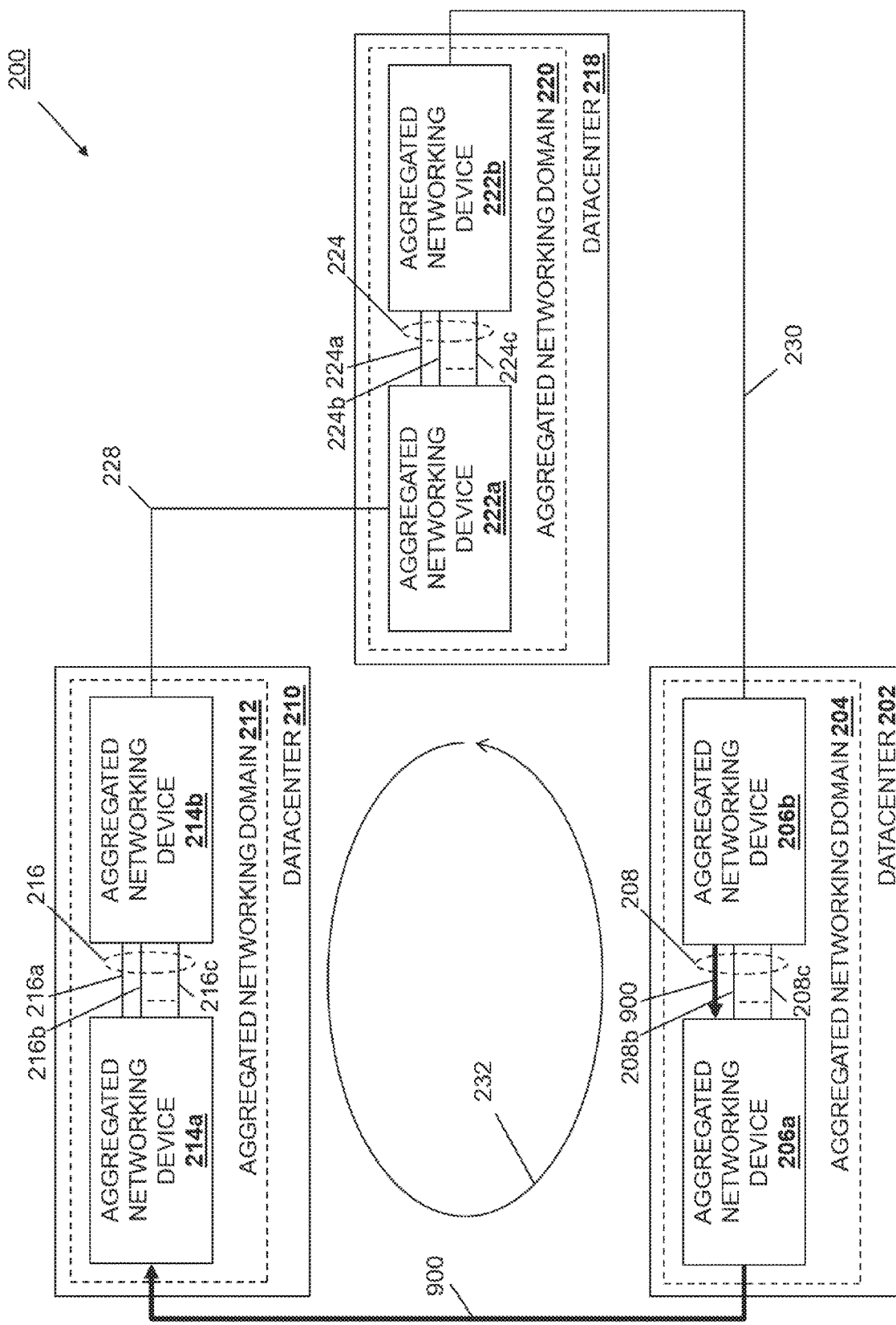
FIG. 9C is a schematic view illustrating an embodiment of the ring control data exchange system of FIG. 2 operating during the method of FIG. 4.

As illustrated in FIG. 6, the ring control data exchange engine 304 in the aggregated networking device 214a/300 may then provide the consolidated control data hash value in a consolidated control data hash value packet 614 to the kernel 604, which may then forward the consolidated control data hash value packet 614 via the communication system 308. With reference to FIG. 9A, an embodiment is illustrated in which the aggregated networking device 214a provides a consolidated hash value packet 900 via the ICL 216 to the aggregated networking device 214b (e.g., via the synchronization operations discussed above), and the aggregated networking device 214b transmits the consolidated hash value packet 900 via the link 228 to the aggregated networking device 222a, at block 410. FIG. 9B illustrates how the aggregated networking device 222a may then provide the consolidated hash value packet 900 via the ICL 224 to the aggregated networking device 222b, and the aggregated networking device 222b may transmit the consolidated hash value packet 900 via the link 230 to the aggregated networking device 206b, at block 410. FIG. 9C illustrates how the aggregated networking device 206b may provide the consolidated hash value packet 900 via the ICL 208 to the aggregated networking device 206a, and the aggregated networking device 206b may transmit the consolidated hash value packet 900 via the link 226 to the aggregated networking device 214a, at block 410. As such, the "repeat" control data packets 800 result in the consolidated hash value packet 900 being circulated around the ring configuration of the aggregated networking domains 212, 220, and 204, and as discussed below, the consolidated hash value packet 900 may be used, for example, by the primary aggregated networking device in each of the aggregated networking domains 212, 220, and 204 to verify the integrity of the rings 232. The method 400 then returns to block 402.

As such, for any "repeat" control data packets that are identical to previously generated control data packets, the ring control data exchange engine in the aggregated networking device, which provides an aggregated networking domain in a datacenter that is included in a ring configuration and configured as a ring master, will generate a consolidated control data hash value for those control data packets, and forward the consolidated control data hash value to aggregated networking devices providing other aggregated networking domains in other datacenters that are included in the ring configuration. As will be appreciated by one of skill in the art in possession of the present disclosure, the transmission of the consolidated hash value in place of the plurality of control data packets reduces the amount of control data transmitted, thus utilizing relatively lower amounts of network bandwidth, requiring a relatively lower utilization of control data processing and other hardware resources in control data source and destination computing devices, and preventing the dropping of control data that occurs in conventional ring control data exchange systems.

Figure 5:
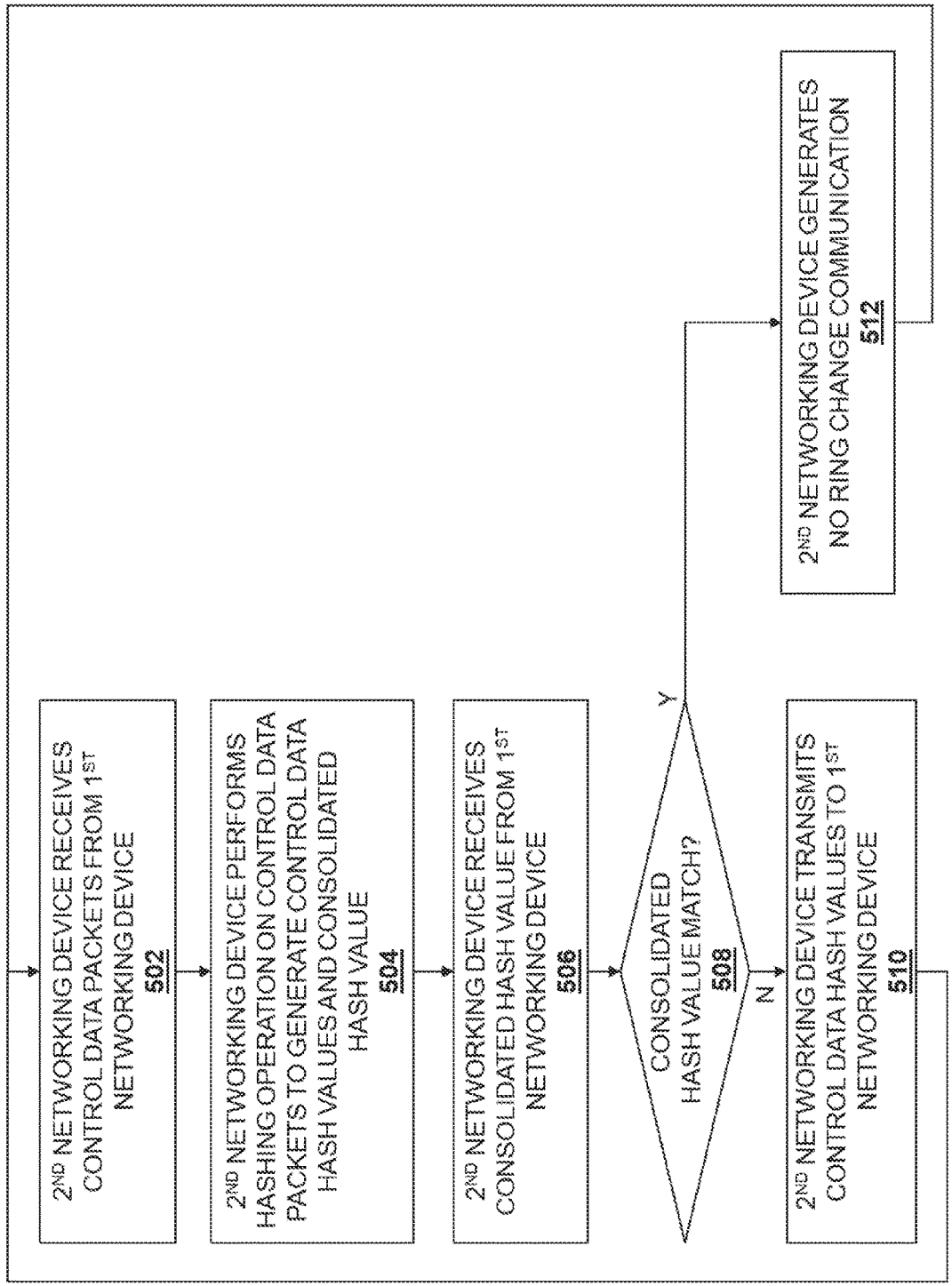
FIG. 5 is a flow chart illustrating an embodiment of a method for exchanging control data in a ring configuration.

Referring now to FIG. 5, an embodiment of a method 500 for exchanging control data in a ring configuration is illustrated. As discussed above, the systems and methods of the present disclosure provide for reductions in the transmission of control data in a ring configuration of aggregated networking domains in respective datacenters, with the method 500 allowing a "control data destination" computing device to receive a consolidated control data hash value (in place of a plurality of duplicative control data packets) that indicates that no rings provided by the aggregated networking domains have failed. For example, a second aggregated networking device that provides a second aggregated networking domain in a second datacenter may receive first control data packets from a first networking device that provides a first aggregated networking domain in a first datacenter, perform a hashing operation on each of the first control data packets to generate the respective first control data hash values and a first consolidated control data hash value, receive the first consolidated control data hash value from the second networking device and, in response, generate a no ring change communication that indicates to its subsystems that no changes to rings have occurred. As will be appreciated by one of skill in the art in possession of the present disclosure, the consolidated control data hash value utilizes relatively lower amounts of network bandwidth, requires a relatively lower utilization of control data processing and other hardware resources in the control data source and destination computing devices, and prevents the dropping of control data that occurs in conventional ring control data exchange systems.

Figure 10:
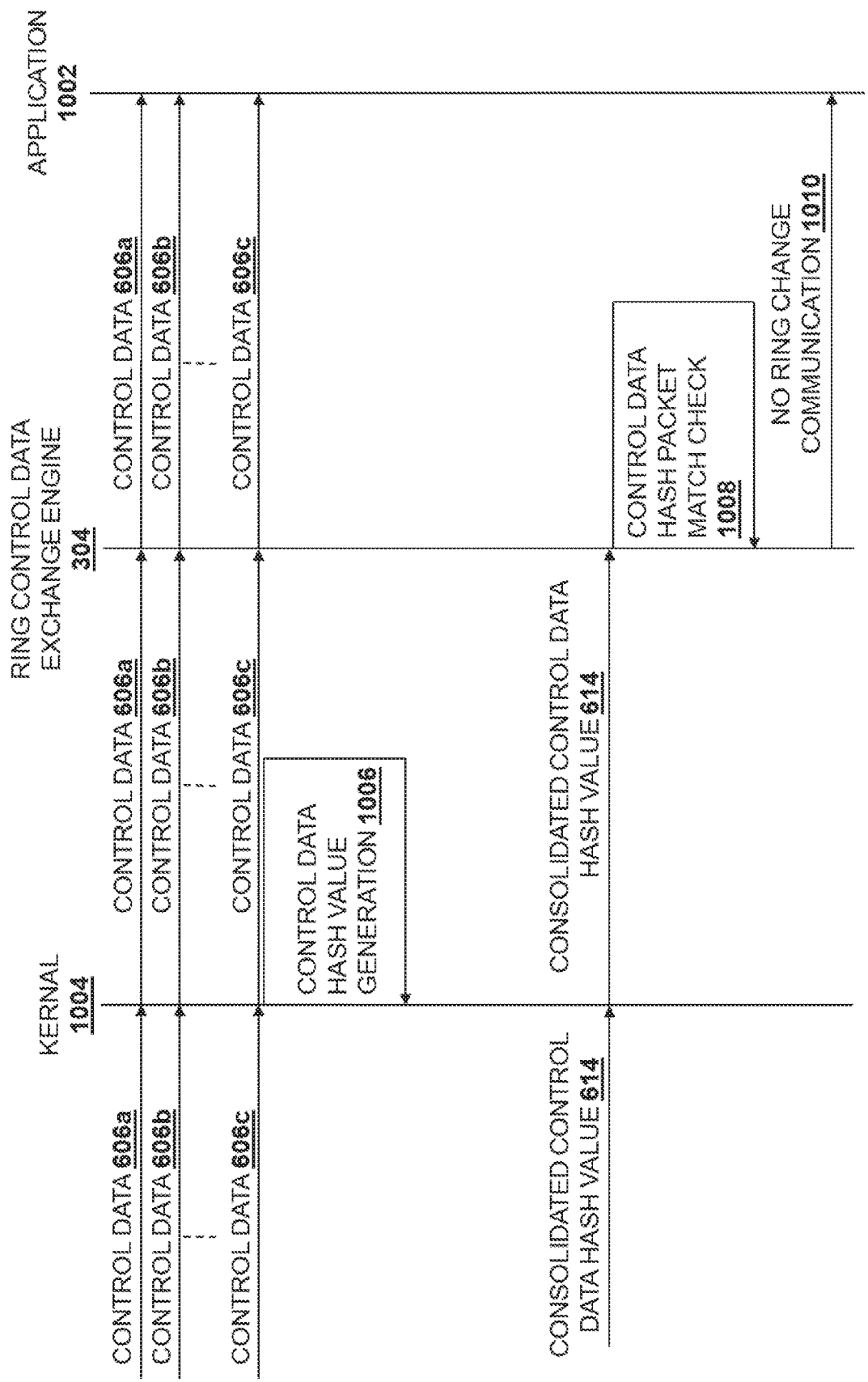
FIG. 10 is a swim-lane diagram illustrating an embodiment of communications performed by the aggregated networking device of FIG. 3 during the method of FIG. 4.

The method 500 begins at block 502 where a second networking device receives control data packets from a first networking device. In an embodiment, the ring control data exchange engine 304 in the aggregated networking device 222a/300 may operate to receive control data packets via its communication system 308. While the examples below primarily discuss the operation of the aggregated networking device 222a/300 that provides the aggregated networking domain 220 in the datacenter 218, one of skill in the art in possession of the present disclosure will appreciate that the discussion below may apply to any aggregated networking device while remaining within the scope of the present disclosure as well. With reference to FIG. 10, a swim lane diagram 600 is provided that illustrates an embodiment of the operation of the aggregated networking device 222a/300, with the ring control data exchange engine 304 in the aggregated networking device 222a/300 in communication with an application 1002 in the aggregated networking device 222a/300 and a kernel 1004 in the aggregated networking device 222a/300. As illustrated in FIG. 10, at block 502, the kernel 1004 may receive the plurality of control data packets 606a, 606b, and 606c (or 800) that were generated by the aggregated networking device 214a and transmitted by the aggregated networking device 214b (as discussed above with reference to FIGS. 6 and 8A), and may provide those control data packets 606a-606c to the ring control data exchange engine 304. For example, as discussed above, the control data packets 606a-606c may be "new" control data packets generated by the aggregated networking device 214a and, as such, the aggregated networking device 214a may provide those control data packets 606a-606c to the aggregated networking device 214b for transmit those control data packets 606a-606c to the aggregated networking device 206a/300. However, one of skill in the art in possession of the present disclosure will appreciate that the ring control data exchange engine 304 may receive control data packets generated in a variety of manners that will fall within the scope of the present disclosure as well.

The method 500 then proceeds to block 504 where the second networking device performs a hashing operation on the control data packets to generate control data hash values and a consolidated control data hash value. In an embodiment, at block 504, the ring control data exchange engine 304 in the aggregated networking device 206a/300 may operate to perform a hashing operation on each of the plurality of control data packets received at block 502 in order to generate respective control data hash values associated with each of those control data packets. As such, with reference FIG. 6, the ring control data exchange engine 304 may perform control data hash value generation operations 1006 on each of the control data packets 606a, 606b, and up to 606c, which one of skill in the art in possession of the present disclosure will appreciate operates to generate respective control data hash values. In addition, the ring control data exchange engine 304 may perform control data hash value generation operations 1006 on those control data hash values in order to generate a consolidated control data hash value as well. In a specific example, the hashing operations (e.g., used to perform the control data hash value generation operations 1006 used to generate the control data hash values and consolidated control data has value) may be performed using the SHA-256, although one of skill in the art in possession of the present disclosure will appreciate that other hashing algorithms or operations will fall within the scope of the present disclosure as well. In some embodiments of block 504, the ring control data exchange engine 304 in the aggregated networking device 206a/300 may store the control data hash values and the consolidated control data hash value in its ring control data exchange database 306.

The method 500 then proceeds to block 506 where the second networking device receives a consolidated control data hash value from the first networking device. In an embodiment, at block 506, the ring control data exchange engine 304 in the aggregated networking device 206a/300 may operate to receive a consolidated control data hash value via its communication system 308. For example, as illustrated in FIG. 10, at block 506, the kernel 1004 may receive the consolidated control data hash value 614/900 that was transmitted by the aggregated networking device 214a (as discussed above with reference to FIGS. 6 and 9A), and may provide the consolidated control data hash value to the ring control data exchange engine 304. For example, as discussed above, the consolidated control data hash value may be generated and transmitted by the aggregated networking device 214a when a set of duplicate control data packets (e.g., control data packets including information that is identical to previously transmitted control data packets) are identified. However, one of skill in the art in possession of the present disclosure will appreciate that the ring control data exchange engine 304 may receive consolidated control data hash values that have been generated in a variety of manners while remaining within the scope of the present disclosure as well The method 500 then proceeds to decision block 508 where it is determined whether there is a consolidated control data hash value match. In an embodiment, at decision block 508, the ring control data exchange engine 304 in the aggregated networking device 206a/300 may operate to check whether the consolidated control data hash value received at block 506 matches a previously generated consolidated control data hash value stored in its ring control data exchange database 306. As discussed above, the receiving of the control data packets 606a-606c resulted in the ring control data exchange engine 304 generating and storing a consolidated control data hash value in the ring control data exchange database 306. As will be appreciated by one of skill in the art in possession of the present disclosure, decision block 508 allows the ring control data exchange engine 304 in the aggregated networking device 206a to check to determine whether any ring changes have occurred, as the consolidated control data hash value generated for any currently received control data packet (i.e., by the aggregated networking device 214a) will only match the consolidated control data hash value generated for any previously received control data packet (i.e., by the aggregated networking device 206a) if the control data packets used to generate those consolidated control data hash values include identical information. For example, with reference FIG. 10, the ring control data exchange engine 304 may perform control data hash value match check operations 1008 and determine whether the consolidated control data hash value received at block 506 matches the consolidated control data hash value generated at block 504 and stored in the ring control data exchange database 306.

If, at decision block 506, it is determined that there is no consolidated control data hash value match, the method 500 proceeds to block 510 where the second networking device transmits the control data hash values to the first networking device. In an embodiment, at block 510 and in response to determining that the consolidated control data hash value received at block 506 does not match the consolidated control data hash value generated at block 504 and stored in the ring control data exchange database 306, the ring control data exchange engine 304 in the aggregated networking device 222a/300 may provide the control data hash values that were generated from the control data packets 606a-606c to the aggregated networking device 222b for transmission to the aggregated networking device 206b via the link 230, and the aggregated networking device 206b may provide those control data hash values over the ICL 208 to the aggregated networking device 206a, which may then transmit those control data hash values via the link 226 to the aggregated networking device 214a. As will be appreciated by one of skill in the art in possession of the present disclosure, in the event of a failure in one of the rings 232, the control data for that ring may change (e.g., no FRRP Hello Ring Health-check Frame (HRHF) communications may be provided by an FRRP PDU for that ring), which causes the control data hash value generated for that control data to change, and the consolidated control data hash value that uses that control data hash value to change as well.

As such, the transmission of the control data hash values from the aggregated networking device 206a to the aggregated networking device 214a in the event the consolidated control data hash value received from the aggregated networking device 214a does not match the consolidated control data hash value previously generated by the aggregated networking device 206a 222a will allow the aggregated networking device 214a to compare the control data hash values it receives from the aggregated networking device 206a with the control data hash values it generated from its most recently received control data in order to determine which control data has changed. Thus, the aggregated networking device 214a may then determine which of the rings 232 has failed by identifying that ring by its changed control data/control data hash value. The method 500 then returns to block 502. As will be appreciated by one of skill in the art in possession of the present disclosure, once the ring that failed once again becomes available again, the method 400 may allow for the sending of the consolidated control data hash value in place of control data packets as described above.

If, at decision block 508, it is determined that there is a consolidated control data hash value match, the method 500 proceeds to block 512 where the second networking device generates a no ring change communication. As illustrated in FIG. 10, in an embodiment of block 512 and in response to determining that the consolidated control data hash value received at block 506 matches the consolidated control data hash value generated at block 504 and stored in the ring control data exchange database 306, the ring control data exchange engine 304 in the aggregated networking device 222a/300 may generate a no ring change communication 1010 that is identified by the application 1002, and that indicates to the application 1002 that no processing need be performed with regard to ring failures. As will be appreciated by one of skill in the art in possession of the present disclosure, in the event of no failure in any of the rings 232, the control data for those rings 232 will not change, the control data hash values for that control data will not change, and the consolidated control data hash value that uses those control data hash values will not change. As such, the determination of a consolidated hash value match ensures the aggregated networking device 206a that no failures have occurred with the rings 232, and the application 1002 may be informed as such with no ring change communication 1010 such that no processing is performed with regard to possible ring failures. The method 500 then returns to block 502. As discussed above with regard to the method 400, the aggregated networking device 222a may the provide the consolidated hash value packet to the aggregated networking device 222b for transmission to the aggregated networking device 206b via the link 230, which may then provide that consolidated hash value packet to the aggregated networking device 206a, and the aggregated networking device 206a may then utilize the consolidated hash value packet to determine whether any changes have occurred in the rings 232 in substantially the same manner as discussed above for the aggregated networking device 222a.

Thus, systems and methods have been described that provide for reductions in the transmission of control data in a ring configuration of VLT domains in respective datacenters, with the method 400 allowing a "control data source" VLT switch device to transmit a consolidated control data hash value when a plurality of duplicative control data is received, with the consolidated control data hash value indicating to "control data destination" VLT switch devices that no rings provided by the VLT domains have failed. For example, a first VLT switch device that provides a first VLT domain in a first datacenter configured as a ring master may identify first control data packets, perform a hashing operation on each of the first control data packets to generate respective first control data hash values, and then transmit the first control data packets to the second VLT switch device. Subsequent to generating the respective first control data hash values, the first VLT switch device may identify second control data packets, perform the hashing operation on each of the second control data packets to generate respective second control data hash values, determine that the respective second control data hash values match the respective first control data hash values and, in response, generate and transmit a first consolidated control data hash value to the second VLT switch device that provides a second VLT domain in a second datacenter while not transmitting the second control data packets to the second VLT switch device. As will be appreciated by one of skill in the art in possession of the present disclosure, the consolidated control data hash value utilizes relatively lower amounts of network bandwidth, requires a relatively lower utilization of control data processing and other hardware resources in the control data sending and receiving VLT switch devices, and prevents the dropping of control data that occurs in conventional ring control data exchange systems Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A ring control data exchange system, comprising:
   a first datacenter including:
      a first networking device; and
   a second datacenter including:
      a second networking device that is included in a ring configuration with the first networking device, wherein the second networking device includes a second processor that is configured to:
         identify a plurality of first control data packets;
         perform a hashing operation on each of the plurality of first control data packets to generate respective first control data hash values;
         transmit the plurality of first control data packets to the first networking device;
         identify, subsequent to generating the respective first control data hash values, a plurality of second control data packets;
         perform the hashing operation on each of the plurality of second control data packets to generate respective second control data hash values;
         determine that the respective second control data hash values match the respective first control data hash values and, in response, perform the hashing operation on the respective first control data hash values or the respective second control data hash values to generate a first consolidated control data hash value; and
         transmit the first consolidated control data hash value to the first networking device while not transmitting the plurality of second control data packets to the first networking device,
      wherein the first networking device includes a first processor that is configured to:
         receive the plurality of first control data packets from the second networking device;

perform the hashing operation on each of the plurality of first control data packets to generate the respective first control data hash values;
perform the hashing operation on the respective first control data hash values to generate the first consolidated control data hash value; and
receive the first consolidated control data hash value from the second networking device and, in response to determining that the first consolidated control hash value received from the second networking device matches the first consolidated control hash value generated by the first networking device, generate a no ring change communication.

2. The system of claim 1, wherein the second networking device is a primary second networking device that is aggregated with a secondary second networking device to provide an aggregated networking domain in the second datacenter.

3. The system of claim 2, wherein the primary second networking device is connected to the first networking device via the secondary second networking device.

4. The system of claim 1, wherein the second networking device is configured to:
identify, subsequent to generating the respective first control data hash values, a plurality of third control data packets;
perform the hashing operation on the plurality of third control data packets to generate respective third control data hash values;
perform the hashing operation on the respective third control data hash values to generate a second consolidated control data hash value; and
determine that the second consolidated control data hash value does not match the first consolidated control data hash value and, in response, transmit the respective third control data hash values to the first networking device.

5. The system of claim 4, wherein the first networking device is configured to:
receive the plurality of first control data packets from the second networking device;
perform the hashing operation on each of the plurality of first control data packets to generate the respective first control data hash values;
receive, subsequent to generating the respective first control data hash values, the respective third control data hash values from the second networking device; and
identify, using the respective first control data hash values and the respective third control data hash values, a ring failure.

6. An Information Handling System (IHS), comprising:
a processing system that includes one or more processors; and
a memory system that is coupled to the processing system and that includes instructions that, when executed by the processing system, cause the processing system to provide a ring control data exchange engine that is configured to:
identify a plurality of first control data packets;
perform a hashing operation on each of the plurality of first control data packets to generate respective first control data hash values;
transmit the plurality of first control data packets out of a first datacenter to a first networking device included in a second datacenter;
identify, subsequent to generating the respective first control data hash values, a plurality of second control data packets;
perform the hashing operation on each of the plurality of second control data packets to generate respective second control data hash values;
determine that the respective second control data hash values match the respective first control data hash values and, in response, perform the hashing operation on the respective first control data hash values or the respective second control data hash values to generate a first consolidated control data hash value;
transmit the first consolidated control data hash value out of the first datacenter to the first networking device included in the second datacenter while not transmitting the plurality of second control data packets to the first networking device;
receive a plurality of third control data packets from the first networking device;
perform the hashing operation on each of the plurality of third control data packets to generate a respective third control data hash values;
perform the hashing operation on the respective third control data hash values to generate a second consolidated control data hash value; and
receive the second consolidated control data hash value from the first networking device and, in response to determining that the second consolidated control hash value received from the first networking device matches the second consolidated control hash value generated by the ring control data exchange engine, generate a no ring change communication.

7. The IHS of claim 6, wherein the ring control data exchange engine is aggregated with a second networking device to provide an aggregated networking domain in the first datacenter.

8. The IHS of claim 7, wherein the ring control data exchange engine is connected to the first networking device via the second networking device.

9. The IHS of claim 6, wherein the ring control data exchange engine is configured to:
identify, subsequent to generating the respective first control data hash values, a plurality of fourth control data packets;
perform the hashing operation on the plurality of fourth control data packets to generate respective fourth control data hash values;
perform the hashing operation on the respective fourth control data hash values to generate a third consolidated control data hash value; and
determine that the third consolidated control data hash value does not match the first consolidated control data hash value and, in response, transmit the respective fourth control data hash values to the first networking device.

10. The IHS of claim 6, wherein the ring control data exchange engine is configured to:
receive a plurality of fourth control data packets from the first networking device;
perform the hashing operation on each of the plurality of fourth control data packets to generate respective fourth control data hash values;
perform the hashing operation on the respective fourth control data hash values to generate a third consolidated control data hash value;
receive, subsequent to generating the respective fourth control data hash values and the third consolidated control data hash value, respective fifth control data hash values from the first networking device; and identify, using the respective fourth control data hash values and the respective fifth control data hash values, a ring failure.

11. The IHS of claim 6, wherein the ring control data exchange engine is configured to:

transmit the plurality of first control data packets out of the first datacenter to a second networking device included in a third datacenter; and determine that the respective second control data hash values match the respective first control data hash values and, in response, generate and transmit the first consolidated control data hash value out of the first datacenter to the second networking device included in the third datacenter while not transmitting the plurality of second control data packets to the second networking device.

12. A method for exchanging control data in a ring configuration, comprising:

identifying, by a first networking device that includes a processor, a plurality of first control data packets;

performing, by the first networking device, a hashing operation on each of the plurality of first control data packets to generate respective first control data hash values;

transmitting, by the first networking device, the plurality of first control data packets out of a first datacenter to a second networking device included in a second datacenter;

identifying, by the first networking device subsequent to generating the respective first control data hash values, a plurality of second control data packets;

performing, by the first networking device, the hashing operation on each of the plurality of second control data packets to generate respective second control data hash values;

determining, by the first networking device, that the respective second control data hash values match the respective first control data hash values and, in response, performing the hashing operation on the respective first control data hash values or the respective second control data hash values to generate a first consolidated control data hash value;

transmitting, by the first networking device, a first consolidated control data hash value out of the first datacenter to the second networking device included in the second datacenter while not transmitting the plurality of second control data packets to the second networking device;

receiving, by the first networking device, a plurality of third control data packets from the second networking device;

performing, by the first networking device, the hashing operation on each of the plurality of third control data packets to generate a respective third control data hash values;

performing, by the first networking device, the hashing operation on the respective third control data hash values to generate a second consolidated control data hash value; and receiving, by the first networking device, the second consolidated control data hash value from the second networking device and, in response to determining that the received second consolidated control hash value received from the second networking device matches the second consolidated control hash value generated by the first networking device, generating a no ring change communication.

13. The method of claim 12, wherein the first networking device is a primary first networking device that is aggregated with a secondary first networking device to provide an aggregated networking domain in the first datacenter.

14. The method of claim 13, wherein the primary first networking device is connected to the second networking device via the secondary first networking device.

15. The method of claim 12, further comprising:

identifying, by the first networking device subsequent to generating the respective first control data hash values, a plurality of fourth control data packets;

performing, by the first networking device, the hashing operation on the plurality of fourth control data packets to generate respective fourth control data hash values;

performing, by the first networking device, the hashing operation on the respective fourth control data hash values to generate a third consolidated control data hash value; and determining, by the first networking device, that the third consolidated control data hash value does not match the first consolidated control data hash value and, in response, transmitting the respective fourth control data hash values to the second networking device.

16. The method of claim 12, further comprising:

receiving, by the first networking device, a plurality of fourth control data packets from the second networking device;

performing, by the first networking device, the hashing operation on each of the plurality of fourth control data packets to generate respective fourth control data hash values;

performing, by the first networking device, the hashing operation on the respective fourth control data hash values to generate a third consolidated control data hash value;

receiving, by the first networking device subsequent to generating the respective fourth control data hash values and the second consolidated control data hash value, respective fifth control data hash values from the second networking device; and identifying, by the first networking device using the respective fourth control data hash values and the respective fifth control data hash values, a ring failure.

17. The method of claim 12, further comprising:

transmitting, by the first networking device, the plurality of first control data packets out of the first datacenter to a third networking device included in a third datacenter; and determining, by the first networking device, that the respective second control data hash values match the respective first control data hash values and, in response, generating and transmitting the first consolidated control data hash value out of the first datacenter to the third networking device included in the third datacenter while not transmitting the plurality of second control data packets to the third networking device.

* * * * *